No. 712,046. Patented Oct. 28, 1902.
W. F. DAWSON.
MEANS FOR ATTACHING COMMUTATOR LEADS.
(Application filed Apr. 27, 1901.)
(No Model.)
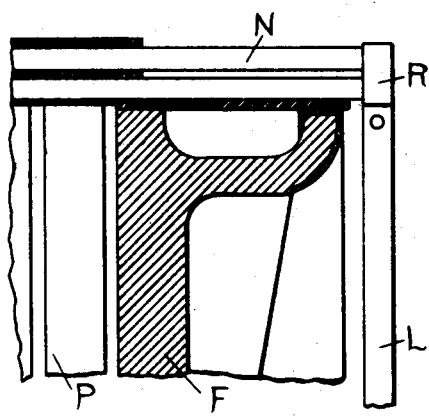
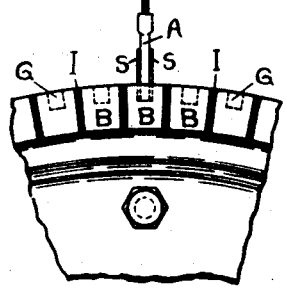
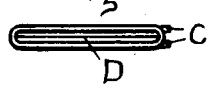
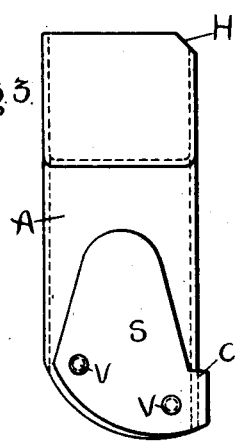
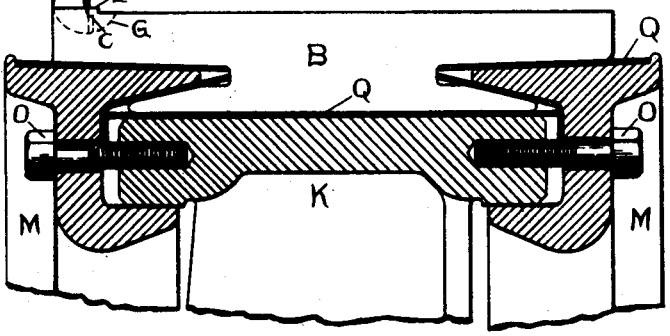
Witnesses:
Inventor
William F. Dawson.
by Atty.

UNITED STATES PATENT OFFICE.

WILLIAM F. DAWSON, OF SCHENECTADY, NEW YORK, ASSIGNOR TO GENERAL ELECTRIC COMPANY, A CORPORATION OF NEW YORK.

MEANS FOR ATTACHING COMMUTATOR-LEADS.

SPECIFICATION forming part of Letters Patent No. 712,046, dated October 28, 1902.

Application filed April 27, 1901. Serial No. 57,670. (No model.)

*To all whom it may concern:*

Be it known that I, WILLIAM F. DAWSON, a citizen of the United States, residing at Schenectady, county of Schenectady, State of New York, have invented certain new and useful Improvements in Means for Attaching Commutator-Leads, (Case No. 1,780,) of which the following is a specification.

This invention relates to a novel means for making electrical couplings between the end connections of armature-coils and the segments or bars of commutators of electric machines.

The end accomplished by the invention is the provision of means for making electrical connections between the armature-coils and commutator-bars after the assembled commutator is put in place on its machine without injuring the commutator in any way— that is to say, such connections can, by means of the invention, be safely made by the manufacturer just before shipment, or in case the machine and commutator are shipped separately the connections can be safely made by the purchaser. Furthermore, such connections can be made with ease and safety at any time—such, for example, as when a single lead may have become detached or damaged after the machine has been operated in practice. The common practice has hitherto been to solder to individual commutator-bars before assemblage commutator-leads which were of sufficient length to extend when the assembled commutator was mounted in its machine from the commutator-segments to the end connections of the armature-coils. A soldered connection is always desirable, because any mere mechanical connection, such as rivets or screws, is practically certain to become loosened during the operation of the machine. It may be properly stated at this point that the problem of connecting armature-coils to commutator-segments has been one of the most difficult mechanical problems with which engineers have been confronted. The assemblage into an annular series of a large number of separate bars each provided with a long trailing lead is obviously an awkward process, and even when the bars are assembled to form the completed commutator it is very inconvenient to have the commutator provided with such a great circular fan-shaped mass of long leads lying about the factory during the time between the assemblage of the commutator and its mounting upon its machine. Furthermore, these leads hindered further work upon the assembled commutator and during such work were inevitably bent and distorted. The leads were also liable to be broken off during this time, and all the objections were greatly aggravated when the leads were of great length, as in cases where the armature-coils of a given machine were designed to lie a considerable radial distance from the surfaces of the commutator-bars. For such conditions the leads are sometimes as long as thirty-six inches, and it is quite clear that an unmounted assembled commutator having soldered to it a great number of radially-extended leads a yard long was a very awkward piece of apparatus to handle, especially when the commutator itself was so large, as in some machines, that it had to be shipped separately from its machine.

The above method of attaching the long leads to the individual segments was the preferred method, although it could be and sometimes was replaced by a method which consisted in soldering the leads to the commutator-bars only after the assembled commutator was mounted on its machine. This latter method was also very objectionable, however, as it was necessary to exercise the greatest care in order to prevent injury to the commutator. Even with the utmost caution, however, it was impossible to completely guard against injury. The objections to this method, which apply as well to the case when the leads were soldered to the assembled commutator-segments before mounting the commutator on its machine as after such mounting, were as follows: In the first place, it was almost impossible to prevent the solder owing to its great capillarity or surface tension from flowing out of the groove in the commutator-bar and spilling over the insulation adjacent to the ends of the bars. When this occurred, the insulation was liable to be burned, and if a single drop of solder fell against and stuck to two successive bars to short-circuit them the machine would be burned out when it was first operated. In tinning the grooves in the bars preparatory to soldering the leads therein the metal was poured into the grooves and was then worked about by a small tool to thoroughly coat the surface of the grooves. The superfluous metal was then raked out by this tool and of course fell over the end of the commutator. Protecting-tape was placed around the end of the commutator; but the metal would flow over and become attached to the ends of the bars and the utmost care was required to remove all such metal. This method was feasible, however, only when carried out before the commutator was mounted on the machine; but after such mounting the commutator end was practically inaccessible, and if a broken lead had to be replaced it was done at the risk of burning out the machine, as the solder which might have dropped could not be entirely and certainly removed. In the second place, the entire bar became heated to such a degree, both during the preparatory tinning and during the process of soldering that, it was liable to burn out the insulation between adjacent bars or between one bar and its support to form short circuits. Incidentally as a large amount of heat was requisite to raise one portion of the bar to a degree sufficient for soldering it was necessary to use a large and clumsy iron. A further disadvantage, although not a vital one, consisted in the fact that when the commutator-leads were attached to the commutator before it was mounted on its machine it was difficult to so attach the free ends of the leads to the end connections of the armature that all the leads would be in alinement. This resulted in an objectionable appearance, although it affected the operation of the machine in no way.

The above-noted difficulties are overcome by this invention in a very simple, cheap, and effective manner, and the invention is now being applied in practice and is expected to supersede in most cases the methods formerly employed.

To the end, therefore, of remedying the defects above pointed out, each individual commutator-bar is before assemblage provided with a device to which the commutator-lead can be safely attached after the bars are assembled to form the complete commutator and preferably after the complete commutator has been mounted on its machine. This device is such that it can be heated sufficiently to solder the lead to it without heating the entire bar or segment to such extent that the insulation will be injured. Furthermore, and herein resides the most important feature of the invention, this device is such that in attaching the lead to it the solder cannot spill over to burn the insulation or short-circuit the bars—that is to say, this device has two functions in combination—first, it can be heated substantially independently of the commutator-bar to which it is attached, and it is so shaped that the solder employed in attaching the lead to the device is prevented from injuring the assembled commutator. In practice the construction of this device and the means of attaching it to its bar can be varied, as occasion may require, without going beyond the boundaries of the invention hereinafter determined by the claims. For example, the device can be riveted or otherwise mechanically secured or attached to the bar, or it can be simply soldered to the bar, or, as shown herein, it can be both soldered and mechanically held. As stated above, however, it is not wise to depend entirely upon a mechanical connection. Furthermore, the device might be formed integral with the commutator-bar, although it is preferably separated in order that the bar will not become heated to a great degree when the device is heated preparatory to the soldering of the lead thereto. When the device is soldered to the bar, however, soldering being the usual method either with or without mechanical connections, care should be taken to provide the device with sufficient radiating-surface so that its lower soldered end will not become heated sufficiently to melt the solder when its upper end is heated preparatory to the soldering of the lead thereto. In any case, no matter what other relation the device may bear to the commutator-bar, it should have sufficient radiating-surface to prevent the entire bar from being heated to a degree sufficient to injure the insulation.

Of the drawings, Figure 1 is a sectional view of the upper portion of a commutator and the outer end of an armature, showing in elevation an armature-lead joining an armature end connection and a commutator-bar. Fig. 2 is an end elevation of a portion of the commutator and the commutator-lead, and Fig. 3 is a side elevation of the device which is secured to a commutator-bar and to which the commutator-lead is attached; and Figs. 4 and 5 are an end elevation and plan view, respectively, of the same device.

The commutator is provided, as usual, with a plurality of segments or bars, which are assembled to form a ring. The individual bars before assemblage are provided with grooves G near one end, which do not, however, extend entirely to the end. These grooves are preferably cut or scooped out by a small circular saw. The end of the bar which is thus scooped out is provided with a wider portion, which forms the shoulders E at the top of the bar. The lower curved portion of the device A (shown in Fig. 3) is adapted to fit the groove G, in which it is secured. This device A is preferably a flat seamless tube of soft copper, the walls being pressed together at the lower end, as shown in Fig. 4, and the upper walls being adapted to form a pocket or depression D in the top of the tube. Strips S of spring copper are secured to the lower adjoining walls of the tube by suitable means, such as rivets V. These strips are provided with projecting portions C, which in combination with the projecting portions E of the commutator-bar coöperate to mechanically lock the tube to the bar. The strips extend freely upward for some distance and serve to take up the strains of the movement of the commutator-lead L, caused by magnetic or mechanical influences, and prevent the tube from being wrenched from its position on the bar. The strips S form no part of this invention, as the idea of their use emanated from another inventor. The tube A, constructed as described, is soldered in the groove G of a separate bar B before assemblage, when the soldering may be done without danger of injuring any adjacent parts. After the tube is soldered in position the projections E of the bar, which lie on opposite sides of the groove G, are bent over the portions C, Figs. 3 and 5, of the strips S to lock the tube mechanically in position. The bars thus provided with the tubes may be conveniently piled together to occupy little space until they are assembled to form a complete commutator, as shown in the lower portion of Fig. 1. The bars are, as usual, mounted upon an annular support K, from which they are insulated by mica strips Q, and are held in place thereon by adjustable end rings M, fitting dovetailed incisions of the bars and provided with bolts O, which engage in the support K. Furthermore, as is customary, the adjacent bars are separated by strips of insulation I, such as mica, as shown in Fig. 2. The assembled commutator is thus provided with only very short projecting portions A, which are not inconvenient in storage or shipment and which are so short that they will not be broken off or bent in handling or transportation.

In the upper portion of Fig. 1 are shown certain of the armature-punchings P and the bracket or flange F which supports the end connections N. These end connections are composed of strips of copper, and their outer ends are soldered in the upper portion R of the commutator-lead, as shown in Fig. 2. This commutator-lead L is preferably composed of two flexible strips of soft copper lying adjacent for the greater portion of their length and separated at the top R to form a receptacle for the end connections N. The lead L is preferably soldered to the end connections before the commutator is mounted upon the machine; but this may be done after such mounting, because the point at which the soldering is done is so far removed from the commutator that the solder would have ample time to cool and harden before it fell upon the commutator. The attachment of the leads to the end connections, however, forms no feature of this invention.

The commutator ready to be mounted upon the machine is provided, as described above, with an annular series of bars having the tubes A secured to their inner ends. The commutator-leads L may have already been secured to the end connections N and in proper alinement with each other. All that remains to be done is to electrically connect the lower ends of the leads with the tubes A, and in accordance with this invention the operation may be done without heating the bar B to excess and without danger of injury to any part of the commutator. The lower tinned end of the flexible lead L is then inserted in the tinned cup-shaped depression or pocket D in the upper portion of the tube A. The depression is slightly larger than the end of the lead, so that space will be provided for the molten solder. The soldering-iron is held against the outside of the upper pocketed portion of the tube, and the stick of solder is held against the lead and the top of the pocket, so that when the parts are sufficiently heated to melt the solder it will flow down into the pocket around the lead. A portion of the top of the tube is cut away, as shown at H, toward the center of the commutator-bar and away from the end of the commutator, so that as soon as the pocket is filled with solder it will fall out over the commutator-bars to indicate to the operator that it is time to move the stick of solder. Thus it is clear that no solder will fall on the commutator at the end of the bars to burn the insulation or short-circuit the bars. As the end of the lead and the depression in the tube A are tinned before the assemblage of the bars and the mounting of the assembled commutator upon the machine, it is of course only necessary to heat the parts once after assemblage. In the cases where formerly the lead was soldered directly to a bar of the assembled commutator either before or after the commutater was mounted on the machine the grooves in all the bars were first tinned. In order to heat the bars for tinning, it was necessary to apply a very large soldering-iron to the upper surfaces of the bars, so that the insulation was liable to be injured. Then when the leads were soldered in the tinned grooves it was necessary to heat the bars once more in the same manner, so that the insulation was twice subjected to the danger of injury. When the lower portion of the tube A is soldered to the bar, as shown herein, instead of being mechanically secured thereto, it is necessary that the tube A should have sufficient radiating-surface to prevent the entire tube from being heated to such an extent that the solder which secures it in the groove will not be melted. For this reason the tube A will be somewhat longer in cases where its lower end is soldered to the bar than when it is held solely by mechanical means, such as rivets.

The advantages of the invention will now be clearly seen, as it is obvious that a means is provided for attaching the commutator-leads to the bars at any time after the commutator is mounted on its machine without the necessity of heating the entire bars and without danger of injuring the commutator.

The disadvantage of having the commutator-leads attached to the bars of the commutator while the latter is in process of construction will be understood and appreciated when it is considered that commutators of a diameter of fifteen feet are sometimes manufactured, and such commutators have hitherto had leads three feet long attached to them before their manufacture was completed. As these leads add six feet to the diameter of the commutator, making a total diameter of twenty-one feet, the increased difficulty of working the commutator in a boring-mill, for example, will be understood. Furthermore, in transporting the commutator to and from different machines the leads were displaced and bent by the hooks of the overhead cranes. The soldering of the entire leads to the bars when they are assembled on the commutator and before the commutator is mounted on the machine is bad enough in view of the fact that two heating processes are required and the spilled solder must be carefully cleaned off before the commutator can be safely mounted on the machine; but these difficulties are greatly enhanced when the ends of the leads are soldered directly to the bars after the commutator is mounted on its machine. In that case the parts where solder is liable to drop may be entirely inaccessible, and it is a matter of mere chance if the insulation has not been injured or the bars short-circuited.

A further advantage of this invention may be here noted—*i. e.*, that the soldering of the end of the commutator-lead in the depression in the tube A is accomplished at a distance more remote from the commutator than in former cases, where the end of the lead was soldered directly to the bar. It is thus evident that even if the solder should spill from the pocket D, which is extremely unlikely, the spilled solder will be cooled and hardened in its passage through the increased distance through the air before it reaches the commutator.

What I claim as new, and desire to secure by Letters Patent of the United States, is—

1. The combination with a commutator-bar, of a metal part secured in conducting relation thereto, said part being provided with a substantially cup-shaped depression to receive the commutator-lead, and with an opening from said depression leading toward the center of the bar, so that the first overflow of solder will not fall over the end of the commutator.

2. The combination with a commutator-bar, of a metal tube closed at its bottom and secured to the bar.

3. The combination with a commutator-bar, of a seamless metal tube which has had its lower walls pressed together to form a pocket or depression to receive the commutator-lead, the lower portion of the tube being secured to the bar.

4. The combination with a commutator-bar, of a metal tube closed at its bottom and secured by the bottom to the bar near one end of the latter, the free or pocketed end of the tube being provided with an opening on the side away from the end of the bar to which the tube is secured.

In witness whereof I have hereunto set my hand this 24th day of April, 1901.

WILLIAM F. DAWSON.

Witnesses:
BENJAMIN B. HULL,
MARGARET E. WOOLLEY.